(12) United States Patent
Higuchi et al.

(10) Patent No.: US 7,074,859 B2
(45) Date of Patent: *Jul. 11, 2006

(54) GOLF BALL

(75) Inventors: Hiroshi Higuchi, Chichibu (JP);
Nobuyuki Kataoka, Chichibu (JP);
Atsushi Nanba, Chichibu (JP);
Hiroyuki Nagasawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 33 days.

This patent is subject to a terminal disclaimer.

(21) Appl. No.: 10/423,050

(22) Filed: Apr. 25, 2003

(65) Prior Publication Data
US 2004/0019149 A1    Jan. 29, 2004

Related U.S. Application Data

(63) Continuation-in-part of application No. 10/191,799, filed on Jul. 10, 2002, now abandoned.

(30) Foreign Application Priority Data
Apr. 30, 2002  (JP) ............................. 2002-128250

(51) Int. Cl.
A63B 37/06    (2006.01)
A63B 37/00    (2006.01)
C08L 9/00     (2006.01)

(52) U.S. Cl. .................... 525/193; 525/261; 525/263; 525/265; 525/274; 473/371; 473/372; 473/377

(58) Field of Classification Search ................ 525/193, 525/261, 263, 265, 274; 473/371, 372, 377
See application file for complete search history.

(56) References Cited

U.S. PATENT DOCUMENTS

| | | |
|---|---|---|
| 4,546,980 A | 10/1985 | Gendreau et al. |
| 4,683,257 A | 7/1987 | Kakiuchi et al. |
| 4,692,497 A | 9/1987 | Gendreau et al. |
| 4,770,422 A | 9/1988 | Isaac |
| 4,929,678 A | 5/1990 | Hamada et al. |
| 4,955,613 A | 9/1990 | Gendreau et al. |
| 5,018,740 A | 5/1991 | Sullivan |
| 5,082,285 A | 1/1992 | Hamada et al. |
| 5,683,773 A * | 11/1997 | Kemper ................. 428/36.91 |
| 5,929,171 A | 7/1999 | Sano et al. |
| 6,113,831 A | 9/2000 | Nesbitt et al. |
| 6,194,505 B1 | 2/2001 | Sone et al. |
| 6,277,924 B1 | 8/2001 | Hamada et al. |
| 6,312,346 B1 | 11/2001 | Sugimoto |
| 6,558,276 B1 | 5/2003 | Yokota et al. |
| 6,583,229 B1 | 6/2003 | Mano et al. |
| 6,899,640 B1 * | 5/2005 | Sasaki et al. .............. 473/371 |
| 2003/0100386 A1 * | 5/2003 | Jordan ..................... 473/374 |
| 2003/0207999 A1 * | 11/2003 | Higuchi et al. ............ 525/274 |

FOREIGN PATENT DOCUMENTS

JP    11-035633        2/1999
JP    11-319348 A     11/1999

OTHER PUBLICATIONS

Akzo Nobel data sheet for Perkadox 14.*
Akzo Nobel data sheet for Perkadox BC-FF.*
Mark R. Mason et al.; "Hydrolysis of Tri-*tert*-butylalumimum: The First Structual Characteristization of Alkylalumoxanes $[(R_2Al)_2O]_n$ and $(RAlO)_n$"; American Chemical Society; vol. 115; No. 12, 1998; pp. 4971-4984.
C. Jeff Harlan et al.; "Three-Coordinate Alumimum Is Not A Prerequisite for Catalytic Acitivity In The Zirconocene-Alumoxane Polymerization of Ethylene"; American Chemical Society, vol. 117, No. 24; 1995; pp. 6465-6474.

* cited by examiner

*Primary Examiner*—David J. Buttner
(74) *Attorney, Agent, or Firm*—Sughrue Mion, PLLC

(57) ABSTRACT

A golf ball is characterized by comprising a molded and vulcanized product of a rubber composition as a constituent component, the rubber composition comprising 100 pbw of a base rubber including 60–100 wt % of a polybutadiene containing at least 60 wt % of cis-1,4-bond, having a Mooney viscosity ($ML_{1+4}$ (100° C.)) of at least 40, and synthesized using a rare-earth catalyst, 10–60 pbw of an unsaturated carboxylic acid and/or a metal salt thereof, 0.1–5 pbw of an organosulfur compound, 5–80 pbw of an inorganic filler, and at least two organic peroxides including an organic peroxide having the shortest half-life at 155° C. designated (a) and another organic peroxide having the longest half-life at 155° C. designated (b), a ratio of half-lives ($b_t/a_t$) being from 7 to 20 wherein $a_t$ is the half-life of (a) and $b_t$ is the half-life of (b), a total content of the organic peroxides being 0.1–0.8 pbw per 100 pbw of the base rubber.

5 Claims, No Drawings

GOLF BALL

CROSS REFERENCE TO RELATED APPLICATION

This application is a continuation-in-part of application Ser. No. 10/191,799 filed on Jul. 10, 2002 now abandoned, the entire contents of which are hereby incorporated by reference.

BACKGROUND OF THE INVENTION

This invention relates to a golf ball which is endowed with good resilience characteristics and satisfactory flight performance due to improvements in a rubber composition of which the solid core or the like is formed.

To confer golf balls with outstanding resilience characteristics various improvements were made in the prior art in formulating the polybutadiene used as the base rubber.

U.S. Pat. No. 4,683,257 proposes a rubber composition for use in solid golf balls, comprising a polybutadiene having a Mooney viscosity of 70 to 100 and synthesized using a nickel or cobalt catalyst, in admixture with another polybutadiene having a Mooney viscosity of 30 to 90 and synthesized using a lanthanoid catalyst or polybutadiene having a Mooney viscosity of 20 to 50 and synthesized using a nickel or cobalt catalyst as the base rubber.

However, the composition of the above patent needs further improvements in resilience.

U.S. Pat. No. 4,955,613 proposes golf balls prepared using a blend of a polybutadiene having a Mooney viscosity of less than 50 and synthesized with a Group VIII catalyst in combination with a polybutadiene having a Mooney viscosity of less than 50 and synthesized with a lanthanide catalyst. However, the resulting golf balls have poor resilience characteristics.

U.S. Pat. No. 6,312,346 proposes a multi-piece solid golf ball having an intermediate layer formed of a low-Mooney viscosity polybutadiene: JP-A 11-319148 proposes a solid golf ball molded from a rubber composition comprising a polybutadiene having a Mooney viscosity of 50 to 69 and synthesized using a nickel or cobalt catalyst in combination with a polybutadiene having a Mooney viscosity of 20 to 90 and synthesized using a lanthanoid catalyst; U.S. Pat. No. 6,194,505 proposes a solid golf ball molded from a rubber composition based on a rubber having a 1,2 vinyl content of at most 2.0% and a weight-average molecular weight to number-average molecular weight ratio Mw/Mn of not more than 3.5; U.S. Pat. No. 4,929,678 proposes a golf ball molded from a rubber composition comprising a high Mooney viscosity polybutadiene; and U.S. Pat. No. 5,082,285 proposes a golf ball molded from a rubber composition comprising polybutadiene having a high number-average molecular weight in admixture with polybutadiene having a low number-average molecular weight. However, none of these proposals are regarded satisfactory in resilience characteristics.

U.S. Pat. No. 4,546,980 describes use of two organic peroxides, and U.S. Pat. No. 4,770,422 describes use of a minor amount of organic peroxide. However, there arise problems including insufficient resilience and a prolonged crosslinking time causing a substantial lowering of productivity.

SUMMARY OF THE INVENTION

An object of the invention is to provide a golf ball which is improved in productivity due to reduced so vulcanization time and exhibits excellent resilience and good flight performance.

Making extensive investigations to achieve the above object, the inventor has found that when a rubber composition is formulated by using a base rubber composed primarily of a polybutadiene containing at least 60% by weight of cis-1,4-bond, having a Mooney viscosity ($ML_{1+4}$ (100° C.)) of at least 40, and synthesized using a rare-earth catalyst, compounding 100 parts by weight of the base rubber with 10 to 60 parts by weight of an unsaturated carboxylic acid and/or a metal salt thereof, 0.1 to 5 parts by weight of an organosulfur compound, and 5 to 80 parts by weight of an inorganic filler, and further compounding therewith at least two organic peroxides including an organic peroxide having the shortest half-life at 155° C. designated (a) and another organic peroxide having the longest half-life at 155° C. designated (b), a ratio of half-lives ($b_t/a_t$) being from 7 to 20 wherein $a_t$ is the half-life of (a) and $b_t$ is the half-life of (b), In a total content of 0.1 to 0.8 part by weight per 100 parts by weight of the base rubber, a golf ball comprising a molded and vulcanized product of the rubber composition as a constituent component, especially a solid golf ball comprising a molded and vulcanized product of the rubber composition as the solid core is improved in manufacture efficiency and resilience characteristics. Specifically, although it is believed in the prior art that if the amount of organic peroxide is reduced, the vulcanization time is prolonged with the results of productivity decline and insufficient resilience, it has been found that by using a highly resilient polybutadiene synthesized with a rare-earth catalyst, and compounding 0.1 to 0.8 part by weight of at least two organic peroxides having largely different half-lives, there are accomplished advantages including easier working, a reduced vulcanization time, improved productivity and further improved resilience.

Accordingly, the present invention provides a golf ball as set forth below.

[I] A golf ball characterized by comprising a molded and vulcanized product of a rubber composition as a constituent component, the rubber composition comprising 100 parts by weight of a base rubber including 60 to 100% by weight of a polybutadiene containing at least 60% by weight of cis-1,4-bond, having a Mooney viscosity ($ML_{1+4}$ (100° C.)) of at least 40, and synthesized using a rare-earth catalyst, 10 to 60 parts by weight of an unsaturated carboxylic acid and/or a metal salt thereof, 0.1 to 5 parts by weight of an organosulfur compound, 5 to 80 parts by weight of an inorganic filler, and at least two organic peroxides including an organic peroxide having the shortest half-life at 155° C. designated (a) and another organic peroxide having the longest half-life at 155° C. designated (b), a ratio of half-lives ($b_t/a_t$) being from 7 to 20 wherein $a_t$ is the half-life of (a) and $b_t$ is the half-life of (b), a total content of the organic peroxides being 0.1 to 0.8 part by weight per 100 parts by weight of the base rubber.

[II] The golf ball of [I] wherein the polybutadiene has a polydispersity index Mw/Mn of 2.0 to 8.0 wherein Mw is a weight average molecular weight and Mn is a number average molecular weight.

[III] The golf ball of [I] or [II] wherein the polybutadiene is a modified polybutadiene rubber which has been synthesized using a neodymium catalyst and subsequently reacted with an end group modifier.

[IV] The golf ball of [I], [II] or [III] wherein the base rubber contains, in addition to the above-mentioned polybutadiene, a second polybutadiene synthesized using a Group VIII catalyst in an amount of up to 40% by weight, the second polybutadiene having a Mooney viscosity ($ML_{1+4}$ (100° C.)) of less than 50 and a viscosity of 200 mPa·s to 400 mPa·s at 25° C. in a 5 wt % toluene solution thereof.

DETAILED DESCRIPTION OF THE INVENTION

The golf ball of the invention comprises a molded and vulcanized product of a rubber composition as a constituent component, the rubber composition comprising (A) a base rubber composed primarily of a polybutadiene-containing at least 60% by weight of cis-1,4-bond, having a Mooney viscosity ($ML_{1+4}$ (100° C.)) of at least 40, and synthesized using a rare-earth catalyst, (B) an unsaturated carboxylic acid and/or a metal salt thereof, (C) an organosulfur compound.

(D) an inorganic filler, and (E) organic peroxides.

The polybutadiene serving as component (A) should contain at least 60% by weight, preferably at least 80% by weight, more preferably at least 90% by weight, most preferably at least 95% by weight of cis-1,4-bond. Too less a cis-1,4-bond content leads to a lowering of resilience or restitution.

The polybutadiene should have a Mooney viscosity ($ML_{1+4}$ (100° C.)) of at least 40, preferably at least 50, more preferably at least 52, most preferably at least 54, and the upper limit of Mooney viscosity is preferably up to 140, more preferably up to 120, even more preferably up to 100, most preferably up to 80.

The term "Mooney viscosity" used herein refers in each case to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement is carried out at a temperature of 100° C.

It is requisite for the polybutadiene used herein to be synthesized with a rare-earth catalyst. Any well-known rare-earth catalyst may be used.

Examples of suitable catalysts include lanthanoid series rare-earth compounds, organoaluminum compounds, alumoxane, and halogen-bearing compounds, optionally in combination with Lewis bases.

Examples of suitable lanthanoid series rare-earth compounds include halides, carboxylates, alcoholates, thioalcoholates and amides of atomic number 57 to 71 metals.

Organoaluminum compounds that may be used include those of the formula $AlR^1R^2R^3$ (wherein $R^1$, $R^2$ and $R^3$ are each independently hydrogen or a hydrocarbon residue of 1 to 8 carbon atoms).

Preferred alumoxanes include compounds of the structures shown in formulas (I) and (II) below. The alumoxane association complexes described in Fine Chemical, 23, No. 9, 5 (1994), J. Am. Chem. Soc., 115, 4971 (1993), and J. Am. Chem. Soc., 117, 6465 (1995) are also acceptable.

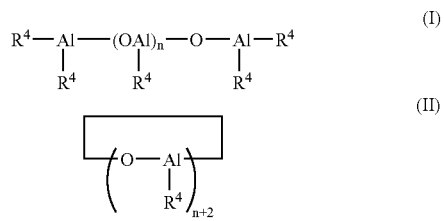

In the above formulas, $R^4$ is a hydrocarbon group having 1 to 20 carbon atoms, and n is an integer of at least 2.

Examples of halogen-bearing compounds that may be used include aluminum halides of the formula $AlX_nR_{3-n}$ (wherein X is a halogen; R is a hydrocarbon residue of 1 to 20 carbon atoms, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$; and other metal halides such as silicon tetrachloride, tin tetrachloride and titanium tetrachloride.

The Lewis base may be used to form a complex with the lanthanoid series rare-earth compound. Illustrative examples include acetylacetone and ketone alcohols.

In the practice of the invention, the use of a neodymium catalyst comprising a neodymium compound as the lanthanoid series rare-earth compound is advantageous because a polybutadiene rubber having a high cis-1,4 content and a low 1,2-vinyl content can be obtained at an excellent polymerization activity. Preferred examples of such rare-earth catalysts include those mentioned in JP-A 11-35633.

For polymerization of butadiene in the presence of a rare-earth catalyst in the form of a lanthanoid series rare-earth compound, in order that the cis content and the Mw/Mn fall in the above-mentioned ranges, the molar ratio of butadiene to lanthanoid series rare-earth compound is preferably from 1,000/1 to 2,000,000/1, especially from 5,000/1 to 1,000,000/1, and the molar ratio of $AlR^1R^2R^3$ to lanthanoid series rare-earth compound is preferably from 1/1 to 1,000/1, especially from 3/1 to 500/1. Further, the molar ratio of halogen compound to lanthanoid series rare-earth compound is preferably from 0.1/1 to 30/1, especially from 0.2/1 to 15/1. The molar ratio of Lewis base to lanthanoid series rare-earth compound is preferably from 0 to 30/1, especially from 1/1 to 10/1.

The polymerization of butadiene in the presence of a rare-earth catalyst may be carried out either with or without the use of solvent, as by bulk polymerization or vapor phase polymerization. The polymerization temperature is generally in a range of −30° C. to 150° C., and preferably 10° C. to 100° C.

It is also possible for the polybutadiene as component (A) to be obtained by polymerization with the above-described rare-earth catalyst, followed by the reaction of an end group modifier with active end groups on the polymer.

Modified polybutadiene rubbers can be prepared by using end group modifiers (1) to (7) listed below, following the above polymerization.

(1) Compounds having an alkoxysilyl group to be reacted with the polymer at active ends thereof. Suitable compounds having an alkoxysilyl group are alkoxysilane compounds having at least one epoxy or isocyanate group in a molecule, for example, epoxy group-containing alkoxysilanes such as 3-glycidyloxypropyltrimethoxysilane,
3-glycidyloxypropyltriethoxysilane,
(3-glycidyloxypropyl)methyldimethoxysilane,
(3-glycidyloxypropyl)methyldiethoxysilane,
β-(3,4-epoxycyclohexyl)trimethoxysilane,
β-(3,4-epoxycyclohexyl)triethoxysilane,
β-(3,4-epoxycyclohexyl)methyldimethoxysilane,
β-(3,4-epoxycyclohexyl)ethyldimethoxysilane, condensates of
3-glycidyloxypropyltrimethoxysilane, and condensates of
(3-glycidyloxypropyl)methyldimethoxysilane; and isocyanato group-containing alkoxysilanes such as
3-isocyanatopropyltrimethoxysilane,
3-isocyanatopropyltriethoxysilane,
(3-isocyanatopropyl)methyldimethoxysilane,
(3-isocyanatopropyl)methyldiethoxysilane, condensates of
3-isocyanatopropyltrimethoxysilane, and condensates of
(3-isocyanatopropyl)methyldimethoxysilane.

When a compound having an alkoxysilyl group is reacted to active ends of the polymer, a Lewis acid may be added for promoting the reaction. The Lewis acid added serves as a catalyst to promote coupling reaction for improving the cold flow and storage stability of the modified polymer. Examples of the Lewis acid include dialkyltin dialkylmaleates, dialkyltin dicarboxylates, and aluminum trialkoxides.

(2) Halogenated organometallic compounds, halogenated metallic compounds and organometallic compounds of the general formulas: $R^5_n M'X_{4-n}$, $M'X_4$, $M'X_3$, $R^5_n M'(—R^6—COOR^7)_{4-n}$ or $R^5_n M'(—R^6—COR^7)_{4-n}$ (wherein $R^5$ and $R^6$ are each independently a hydrocarbon group of 1 to 20 carbon atoms; $R^7$ is a hydrocarbon group of 1 to 20 carbon atoms which may contain a carbonyl or ester moiety on a side chain; M' is a tin atom, silicon atom, germanium atom or phosphorus atom; X is a halogen atom; and n is an integer from 0 to 3).

(3) Heterocumulene compounds containing on the molecule a Y=C=Z linkage (wherein Y is a carbon atom, oxygen atom, nitrogen atom or sulfur atom: and Z is an oxygen atom, nitrogen atom or sulfur atom).

(4) Three-membered heterocyclic compounds containing on the molecule the following linkage:

(wherein Y is an oxygen atom, nitrogen atom or sulfur atom).

(5) Halogenated isocyano compounds.

(6) Carboxylic acids, acid halides, ester compounds, carbonate compounds or acid anhydrides of the formulas: $R^8—(COOH)_m$, $R^9(COX)_m$, $R^{10}—(COO—R^{11})_m$, $R^{12}—OCOO—R^{13}$, $R^{14}—(COOCO—R^{15})_m$ or the following formula:

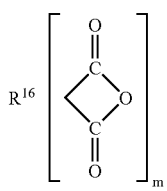

(wherein $R^8$ to $R^{16}$ are each independently a hydrocarbon group of 1 to 50 carbon atoms; X is a halogen atom; and m is an integer from 1 to 5); and (7) Carboxylic acid metal salts of the formula: $R^{17}_1 M''(OCOR^{18})_{4-1}$, $R^{19}_1 M''(OCO—R^{20}—COOR^{21})_{4-1}$ or the following formula:

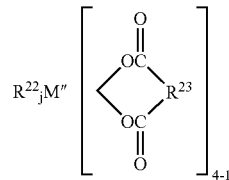

(wherein $R^{17}$ to $R^{23}$ are each independently a hydrocarbon group of 1 to 20 carbon atoms, M" is a tin atom, silicon atom or germanium atom; and 1 is an integer from 0 to 3).

Illustrative examples of the end group modifiers of types (1) to (7) above and methods for their reaction are described in, for instance, JP-A 11-35633, JP-A 7-268132 and JP-A 2002-293996.

In the practice of the invention, the above-mentioned polybutadiene should preferably have a polydispersity index Mw/Mn (wherein Mw is a weight average molecular weight and Mn is a number average molecular weight) of at least 2.0, more preferably at least 2,2, even more preferably at least 2.4, most preferably at least 2.6, but up to 8.0, more preferably up to 7.5, even more preferably up to 4.0, most preferably up to 3.4. Too low Mw/Mn may lead to low working efficiency whereas too high Mw/Mn may lead to low resilience.

The invention uses a base rubber composed primarily of the above-mentioned polybutadiene. Specifically, the polybutadiene may be included in an amount of at least 60% by weight, preferably at least 70% by weight, more preferably at least 80% by weight, most preferably at least 85% by weight, based on the base rubber. It is acceptable that 100% by weight of the base rubber is the above-mentioned polybutadiene while the polybutadiene content may be up to 95% by weight, and in some cases, up to 90% by weight.

Suitable rubber components other than the above-mentioned polybutadiene Include polybutadienes other than the above-mentioned polybutadiene, such as polybutadiene synthesized with a Group VIII metal compound catalyst, and other diene rubbers, such as styrene-butadiene rubber, natural rubber, isoprene rubber, and ethylene-propylene-diene rubber.

Of the rubber components other than the above-mentioned polybutadiene, a second polybutadiene synthesized with a Group VIII catalyst and having a Mooney viscosity ($ML_{1+4}$ (100° C.)) of less than 50 and a viscosity η of 200 mPa·s to 400 mPa·s at 25° C. in a 5 wt % toluene solution thereof is advantageously used because high resilience and efficient working are accomplished.

Illustrative of the Group VIII catalyst are nickel and cobalt catalysts described below.

Examples of suitable nickel catalysts include single-component systems such as nickel-kieselguhr, binary systems such as Raney nickel/titanium tetrachloride, and ternary systems such as nickel compound/organometallic compound/boron trifluoride etherate. Exemplary nickel compounds include reduced nickel on a carrier, Raney nickel, nickel oxide, nickel carboxylate and organonickel complexes. Exemplary organometallic compounds include trialkylaluminum compounds such as triethylaluminum, tri-n-propylaluminum, triisobutylaluminum and tri-n-hexylaluminum; alkyllithium compounds such as n-butyllithium, sec-butyllithium, tert-butyllithium and 1,4-dilithiumbutane; and dialkylzinc compounds such as diethylzino and dibutylzinc.

Examples of suitable cobalt catalysts include cobalt and cobalt compounds such as Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithio-carbamate, cobalt anilinium nitrite and cobalt dinitrosyl chloride. It is particularly advantageous to use the above in combination with a dialkylaluminum monochloride such as diethylaluminum monochloride or diisobutylaluminum monochlorlde; a trialkylalumlnum such as triethylaluminum, tri-n-propylaluminum, triisobutylaluminum or tri-n-hexylaluminum; an alkyl aluminum sesquichloride such as ethylaluminum sesquichloride; or aluminum chloride.

Polymerization using the Group VIII catalysts described above, and especially a nickel or cobalt catalyst, can generally be carried out by a process in which the catalyst is continuously charged into the reactor together with the solvent and butadiene monomer, and the reaction conditions are suitably selected from a temperature range of 5 to 60° C. and a pressure range of atmospheric pressure to 70 plus atmospheres, so as to yield a product having the above-indicated Mooney viscosity.

The second polybutadiene should have a Mooney viscosity of less than 50, preferably up to 48, more preferably up to 45. The lower limit of Mooney viscosity is preferably at least 10, more preferably at least 20, even more preferably at least 25, most preferably at least 30.

The second polybutadiene should preferably have a viscosity η of at least 200 mPa·s, more preferably at least 210 mPa·s, even more preferably at least 230 mPa·s, most preferably at least 250 mPa·s, and up to 400 mPa·s, more preferably up to 370 mPa·s, even more preferably up to 340 mPa·s, most preferably up to 300 mPa·s, as measured in a 5 wt % toluene solution thereof at 25° C.

The "viscosity η at 25° C. in a 5 wt % toluene solution" refers herein to the value in mPa·s units obtained by dissolving 2.28 g of the polybutadiene to be measured in 50 ml of toluene and carrying out measurement with a specified viscometer at 25° C. using a standard solution for the viscometer (JIS Z8809).

The second polybutadiene may be included in the base rubber in an amount of at least 0% by weight, preferably at least 5% by weight, more preferably at least 10% by weight, and preferably up to 40% by weight, more preferably up to 30% by weight, even more preferably up to 20% by weight, most preferably up to 15% by weight.

Suitable unsaturated carboxylic acids serving as component (B) include acrylic acid, methacrylic acid, maleic acid and fumaric acid. Acrylic acid and methacrylic acid are especially preferred. Suitable unsaturated carboxylic acid metal salts include the zinc and magnesium salts of unsaturated fatty acids. Zinc acrylate is especially preferred.

The unsaturated carboxylic acid and/or salt thereof serving as component (B) is preferably included in an amount, per 100 parts by weight of the base rubber as component (A), of at least 10 parts-by weight, more preferably at least 15 parts by weight, even more preferably at least 20 parts by weight, but not more than 60 parts by weight, more preferably not more than 50 parts by weight, even more preferably not more than 45 parts by weight, and most preferably not more than 40 parts by weight.

The organosulfur compound serving as component (C) includes, for example, thiophenols, thionaphthols, halogenated thiophenols, and metal salts thereof. Specific examples include pentachlorothiophenol, pentafluorothiophenol, pentabromothiophenol, p-chlorothiophenol, and zinc salts thereof; and organosulfur compounds having 2 to 4 sulfur atoms, such as diphenyl polysulfides, dibenzyl polysulfides, dibenzoyl polysulfides, dibenzothiazoyl polysulfides, dithiobenzoyl polysulfides, alkylphenyl disulfides, sulfur compounds having a furan ring, and sulfur compounds having a thiophene ring. The zinc salt of pentachlorothiophenol and diphenyl disulfide are especially preferred.

The organosulfur compound should be included in an amount, per 100 parts by weight of the base rubber (A), of at least 0.1 part, more preferably at least 0.2 part, even more preferably at least 0.4 part, and most preferably at least 0.7 part by weight, but not more than 5 parts, preferably not more than 4 parts, more preferably not more than 3 parts, even more preferably not more than 2 parts, and most preferably not more than 1.5 parts by weight. Too less an amount of the organosulfur compound is ineffective for improving resilience whereas too much an amount gives too low a hardness and fails to provide sufficient resilience.

Exemplary inorganic fillers serving as component (D) include zinc oxide, barium sulfate and calcium carbonate. The inorganic filler is included in an amount, per 100 parts by weight of component (A), of at least 5 parts, preferably at least 7 parts, more preferably at least 10 parts, and most preferably at least 13 parts by weight, but not more than 80 parts, more preferably not more than 65 parts, even more preferably not more than 50 parts, and most preferably not more than 40 parts by weight. Too much or too less an amount of the filler fails to achieve an optimum weight and appropriate resilience.

Two or more organic peroxides are used as component (E). Provided that an organic peroxide having the shortest half-life at 155° C. is designated (a), another organic peroxide (b) having the longest half-life at 155° C. is designated (b), the half-life of (a) is designated $a_t$, and the half-life of (b) is designated $b_t$, the ratio of half-lives $(b_t/a_t)$ should be at least 7, preferably at least 8, more preferably at least 9, even more preferably at least 10, and up to 20, more preferably up to 18, even more preferably up to 16. Even when two or more organic peroxides are used, a half-life ratio outside the range may lead to poor resilience, compression and durability.

Herein, the half-life $(a_t)$ at 155° C. of the peroxide (a) is preferably at least 5 seconds, more preferably at least 10 seconds, even more preferably at least 15 seconds, and up to 120 seconds, more preferably up to 90 seconds, even more preferably up to 60 seconds. The half-life $(b_t)$ at 155° C. of the peroxide (b) is preferably at least 300 seconds, more preferably at least 360 seconds, even more preferably at least 420 seconds, and preferably up to 800 seconds, more preferably up to 700 seconds, even more preferably up to 600 seconds.

Illustrative examples of the organic peroxides include dicumyl peroxide, 1,1-bis(t-butylperoxy)-3,3,5-trimethylcyclohexane, and α,α'-bis(t-butylperoxy)diisopropylbenzene. The organic peroxides used may be commercial products, suitable examples of which include Percumyl D (manufactured by NOF Corporation), Perhexa 3M (manufactured by NOF Corporation) and Luperco 231XL (manufactured by Atochem Co.). The preferred organic peroxide (a) is 1,1-bis(t-butylperoxy)-3,3,5-trimethylcyclohexane, and the preferred organic peroxide (b) is dicumyl peroxide.

The total content of the organic peroxides including (a) and (b) is at least 0.1 part, preferably at least 0.2 part, more preferably at least 0.3 part, even more preferably at least 0.4 part by weight and up to 0.8 part, preferably up to 0.7 part, more preferably up to 0.6 part, even more preferably up to 0.5 part by weight, per 100 parts by weight of component (A). Too low an organic peroxide content leads to an extended time required for crosslinking, a substantial lowering of productivity, and a substantial lowering of compression. With too high a content, resilience and durability decline.

The amount of peroxide (a) added per 100 parts by weight of component (A) is preferably at least 0.05 part, more preferably at least 0.08 part, even more preferably at least 0.1 part by weight, but preferably up to 0.5 part, more preferably up to 0.4 part, even more preferably up to 0.3 part by weight. The amount of peroxide (b) added per 100 parts by weight of component (A) is preferably at least 0.05 part, more preferably at least 0.15 part, even more preferably at least 0.2 part by weight, but preferably up to 0.7 part, more preferably up to 0.6 part, even more preferably up to 0.5 part by weight.

If necessary, an antioxidant may be included in an amount of at least 0.05 part, more preferably at least 0.1 part, even more preferably at least 0.2 part by weight, but not more than 3 parts, more preferably not more than 2 parts, even more preferably not more than 1 part, and most preferably not more than 0.5 part by weight, per 100 parts by weight of component (A). The antioxidants used may be commercial products, for example, Nocrack NS-6 and NS-30 (Ouchi Shinko Chemical Industry Co., Ltd.), and Yoshinox 425 (Yoshitomi Pharmaceutical Industries, Ltd.).

The molded and vulcanized product according to the invention is obtainable by vulcanizing or curing the above-described rubber composition in a similar manner as are well-known golf ball-forming rubber compositions. Vulcanization may be carried out under suitable conditions, for example, a vulcanization temperature of 100 to 200° C. and a vulcanization time of 10 to 40 minutes.

In the invention, the hardness of the molded/vulcanized product can be adjusted as appropriate in accordance with any serviceable one of various golf ball constructions to be described later, and is not particularly limited. The cross-sectional hardness may either be flat from the center to the surface of the molded product or have a difference between the center and the surface of the molded product.

The golf ball of the Invention may take any of various golf ball constructions to be described later. Particularly when the golf ball is a one-piece golf ball or a golf ball having a solid core or solid center, it is recommended that the one-piece solid golf ball, solid core or solid center generally have a deflection under an applied load of 980 N (100 kg) of at least 2.0 mm, preferably at least 2.5 mm, more preferably at least 2.8 mm, most preferably at least 3.2 mm, but up to 6.0 mm, preferably up to 5.5 mm, more preferably up to 5.0 mm, most preferably up to 4.5 mm. Too small a deformation may lead to a poor feel and in particular, too much spin on long shots with a driver or similar club designed to induce large deformation to the ball, falling to travel a distance. If too soft, probable results are a dull feel, insufficient resilience, a failure to travel a distance, and poor crack durability upon repetitive impacts.

As long as the golf ball of the invention includes the above molded/vulcanized product as a constituent component, the construction of the ball is not critical. Examples of suitable golf ball constructions Include one-piece golf balls in which the molded/vulcanized product itself is used directly as the golf ball, two-piece solid golf balls wherein the molded/vulcanized product serves as a solid core on the surface of which a cover is formed, multi-piece solid golf balls made of three or more pieces in which the molded/vulcanized product serves as a solid core over which a cover composed of two or more layers is formed, and thread-wound golf balls in which the molded/vulcanized product serves as the center core. From the standpoints of taking advantage of the characteristics of the molded/vulcanized product, enabling-extrusion during manufacture, and imparting resilience characteristics to golf ball products, the two-piece solid golf balls and multi-piece solid golf balls in which the molded/vulcanized product is used as the solid core are recommended as the preferred construction.

In one embodiment of the invention wherein the molded/vulcanized product is used as a solid core in the manner described above, it is recommended that the solid core have a diameter of at least 30.0 mm, preferably at least 32.0 mm, more preferably at least 35.0 mm, and most preferably at least 37.0 mm, but not more than 41.0 mm, preferably not more than 40.5 mm, even more preferably not more than 40.0 mm, and most preferably not more than 39.5 mm. In particular, it is desirable for such a solid core in a two-piece solid golf ball to have a diameter of at least 37.0 mm, preferably at least 37.5 mm, even more preferably at least 38.0 mm, and most preferably at least 38.5 mm, but not more than 41.0 mm, preferably not more than 40.5 mm, and most preferably not more than 40.0 mm. Similarly, it is desirable for such a solid core in a three-piece solid golf ball to have a diameter of at least 30.0 mm, preferably at least 32.0 mm, more preferably at least 34.0 mm, and most preferably at least 35.0 mm, but not more than 40.0 mm, preferably not more than 39.5 mm, and most preferably not more than 39.0 mm.

It is also recommended that the solid core have a specific gravity of at least 0.9, preferably at least 1.0, and most preferably at least 1.1, but not more than 1.4, preferably not more than 1.3, and most preferably not more than 1.2.

When the golf ball of the invention is a two-piece solid golf ball or a multi-piece solid golf ball, it can be manufactured by using the molded/vulcanized product as the solid core, and injection molding or compression molding known Intermediate layer and cover materials therearound.

These intermediate layer and cover materials may be mainly composed of, for example, a thermoplastic or thermosetting polyurethane elastomer, polyester elastomer, ionomer resin, polyolefin elastomer or mixture thereof. Any one or mixture of two or more thereof may be used, although the use of a thermoplastic polyurethane elastomer or ionomer resin is especially preferred.

Illustrative examples of thermoplastic polyurethane elastomers that may be used include commercial products in which the diisocyanate is an aliphatic or aromatic compound, such as Pandex T7298, T7295, T7890, TR3080, T8295 and T8290 (manufactured by DIC Bayer Polymer Ltd.). Illustrative examples of suitable commercial ionomer resins include Surlyn 6320 and 8120 (manufactured by E. I. du Pont de Nemours and Co., Inc.), and Himilan 1706, 1605, 1855, 1601 and 1557 (manufactured by DuPont-Mitsui Polychemicals Co., Ltd.).

Together with the main ingredient described above, the intermediate layer or cover material may include also, as an optional ingredient, polymers (e.g., thermoplastic elastomers) other than the foregoing specific examples of polymers that may be included as optional ingredients include polyamide elastomers, styrene block elastomers, hydrogenated polybutadienes and ethylene-vinyl acetate (EVA) copolymers.

Two-piece solid golf balls and multi-piece solid golf balls according to the invention can be manufactured by a known method. For the manufacture of two-piece and multi-piece solid golf balls, use is advantageously made of, but not limited thereto, a well-known method involving the steps of placing the above-described molded/vulcanized product as the solid core within a predetermined injection mold, and injecting the above-described cover material over the core in a predetermined way in the case of a two-piece solid golf ball, or successively injecting the above-described intermediate layer material and cover material in a predetermined way In the case of a multi-piece solid golf ball. In some cases, the golf ball may be produced by molding the cover material under an applied pressure.

It is recommended that the intermediate layer in a multi-piece solid golf ball have a gage of at least 0.5 mm, and preferably at least 1.0 mm, but not more than 3.0 mm, preferably not more than 2.5 mm, more preferably not more than 2.0 mm, and most preferably not more than 1.6 mm.

Moreover, in both two-piece solid golf balls and multi-piece solid golf balls, it is recommended that the cover have a gage of at least 0.7 mm and preferably at least 1.0 mm, but not more than 3.0 mm, preferably not more than 2.5 mm, more preferably not more than 2.0 mm, and most preferably not more than 1.6 mm.

The golf ball of the invention can be manufactured for competitive use so as to meet the Rules of Golf, that is, to a diameter of at least 42.67 mm and a weight of not more than 45.93 g. It is recommended that the upper limit of diameter be no more than 44.0 mm, preferably no more than 43.5 mm and most preferably no more than 43.0 mm; and that is the lower limit of weight be at least 44.5 g, preferably at least 45.0 g, more preferably at least 45.1 g, and most preferably at least 45.2 g.

The golf balls of the invention have excellent resilience characteristics.

EXAMPLE

Examples and comparative examples are given below to illustrate the invention, and are not intended to limit the scope thereof.

Examples 1–10 & Comparative Examples 1–7

Cores of two-piece golf balls were manufactured using rubber compositions shown in Tables 1 and 2. The cores had an outer diameter of 38.9 mm and a weight of 36.0 g. A cover material which was a mixture of Himilan 1601 and Himilan 1557 in a weight ratio of 1:1 was injected around the cores, forming dimpled golf balls. Their surface was coated with paint, yielding two-piece solid golf balls having an outer diameter of 42.7 mm and a weight of 45.3 g.

By the following test methods, the cores were examined for deflection under a load of 100 kg (980 N) and initial velocity, and the golf balls evaluated for flight performance. The results are shown in Tables 1 and 2.

Examples 11–13 & Comparative Examples 8–10

Cores of three-piece golf balls were manufactured using rubber compositions shown in Table 3. The cores had an outer diameter of 35.3 mm and a weight of 31.0 g. A mixture of Himilan 1706 and Himilan 1605 in a weight ratio of 1:1 was injected around the cores, forming an intermediate layer (the diameter of core+intermediate layer was 38.7 mm).

A cover material which was a mixture of Himilan 1650 and Surlyn 8120 in a weight ratio of 1:1 was then injected, yielding three-piece solid golf balls having an outer diameter of 42.7 mm and a weight of 45.3 g.

By the following test methods, the cores were examined for deflection under a load of 100 kg (980 N) and initial velocity, and the golf balls evaluated for flight performance. The results are shown in Table 3.

Deflection Under 100 kg Loading
Measured as the deformation (mm) of the solid core under an applied load of 100 kg (980 N).

Initial Velocity
The initial velocity of the core was measured with the same type of initial velocity instrument as used by the official association USGA. The initial velocity of Examples 1–10 and Comparative Examples 1–7 is reported as a difference from that of Comparative Example 1, and the initial velocity of Examples 11–13 and Comparative Examples 8–10 is reported as a difference from that of Comparative Example 8.

Flight Performance
The flight performance of the golf ball was determined by using a hitting machine, and hitting the ball with a driver (W#1, Tour Stage X500. loft 9°, shaft X, Bridgestone Sports Co., Ltd.) at a head speed (HS) of 45 m/s.

TABLE 1

| | | Example | | | | | | | | | |
|---|---|---|---|---|---|---|---|---|---|---|---|
| Components (pbw) | | 1 | 2 | 3 | 4 | 5 | 6 | 7 | 8 | 9 | 10 |
| Poly- | BR01 | | | | | | | | | | |
| butadiene | BR11 | | | | 10 | 20 | | 20 | | | |
| | CB22 | | | | | | 100 | 80 | | | |
| | Shell 1220 | | | | | | | | | | |
| | CB24 | | | | | | | | | 100 | |
| | CNB700 | | | 100 | | | | | | | |
| | HCBN-13 | 100 | 100 | | 90 | 80 | | | 100 | | |
| | HCBN-2 | | | | | | | | | | 100 |

TABLE 1-continued

| Components (pbw) | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Peroxide | | Half-life at 155° C. (sec) | | | | | | | | | | |
| | (a) Perhexa 3M-40 | 40 | 0.12 | 0.06 | 0.12 | 0.12 | 0.12 | 0.12 | 0.12 | 0.12 | 0.12 | 0.12 |
| | Vulcup R | 0.5 | | | | | | | | | | |
| | (b) Percumyl D | 480 | 0.3 | 0.3 | 0.3 | 0.3 | 0.3 | 0.3 | 0.3 | 0.6 | 0.3 | 0.3 |
| | Varox 231XL | 40 | | | | | | | | | | |
| Half-life ratio ($b_t/a_t$) | | | 12 | 12 | 12 | 12 | 12 | 12 | 12 | 12 | 12 | 12 |
| Total amount of peroxides | | | 0.42 | 0.36 | 0.42 | 0.42 | 0.42 | 0.42 | 0.42 | 0.72 | 0.42 | 0.42 |
| Zinc oxide | | | 19.3 | 19.3 | 19.3 | 19.3 | 19.3 | 19.3 | 19.3 | 19.3 | 19.3 | 19.3 |
| Antioxidant | Nocrack NS-6 | | 0.1 | 0.1 | 0.1 | 0.1 | 0.1 | 0.1 | 0.1 | 0.1 | 0.1 | 0.1 |
| Processing aids | SR-350 | | | | | | | | | | | |
| Zinc acrylate | | | 29 | 29 | 29 | 29 | 29 | 29 | 29 | 29 | 29 | 29 |
| Organosulfur compound | Zn salt of pentachlorothiophenol | | 1 | 1 | 1 | 1 | 1 | 1 | 1 | 1 | 1 | 1 |
| Core | Vulcanization time (min) | | 14 | 15 | 15 | 15 | 16 | 16 | 17 | 13 | 16 | 15 |
| | Deflection (mm) under 100 kg load | | 3.7 | 3.9 | 3.9 | 3.8 | 3.8 | 4.0 | 4.1 | 3.5 | 4.0 | 4.0 |
| | Initial velocity (m/s) | | +0.4 | +0.3 | +0.1 | +0.3 | +0.3 | +0.2 | +0.1 | +0.3 | +0.2 | +0.1 |
| Flight performance | Carry (m) | | 219.2 | 218.0 | 216.2 | 218.1 | 217.9 | 217.1 | 216.1 | 218.0 | 217.1 | 216.1 |
| | Total (m) | | 233.3 | 232.1 | 230.2 | 232.2 | 232.0 | 230.9 | 230.3 | 231.9 | 231.0 | 230.4 |

TABLE 2

| Components (pbw) | | | Comparative Example | | | | | | |
|---|---|---|---|---|---|---|---|---|---|
| | | | 1 | 2 | 3 | 4 | 5 | 6 | 7 |
| Polybutadiene | BR01 | | | 100 | 80 | | 15 | | |
| | BR11 | | | | | | | | |
| | CB22 | | | | | | 100 | | |
| | Shell 1220 | | | | | | | 85 | |
| | CB24 | | | | | 20 | | | |
| | CNB700 | | | | | | | 100 | 100 |
| | HCBN-13 | | 100 | | | | | | |
| | HCBN-2 | | | | | | | | |
| Peroxide | | Half-life at 155° C. (sec) | | | | | | | |
| | (a) Perhexa 3M-40 | 40 | 0.24 | 0.12 | | | | | |
| | Vulcup R | 0.5 | | | | | 0.1 | | |
| | (b) Percumyl D | 480 | 0.6 | 0.3 | 1 | 2 | | 1.8 | 1 |
| | Varox 231XL | 40 | | | | | 0.43 | | |
| Half-life ratio ($b_t/a_t$) | | | 12 | 12 | ∞ | ∞ | 80 | ∞ | ∞ |
| Total amount of peroxide | | | 0.84 | 0.42 | 1.00 | 2.00 | 0.53 | 1.80 | 1.00 |
| Zinc oxide | | | 20 | 19.3 | 18.8 | 19.5 | 20.5 | 22 | 22.6 |
| Antioxidant | Nocrack NS-6 | | 0.1 | 0.1 | | 0.5 | | 0.5 | |
| Processing aids | SR-350 | | | | | | 1.5 | | |
| Zinc acrylate | | | 27 | 29 | 32 | 31 | 28 | 25 | 23 |
| Organosulfur compound | Zn salt of pentachlorothiophenol | | 1 | 1 | | | | | |
| Core | Vulcanization time (min) | | 13 | 19 | 11 | 11 | 19 | 11 | 11 |
| | Deflection (mm) under 100 kg load | | 3.7 | 4.2 | 2.4 | 2.7 | 3.4 | 3.6 | 3.8 |
| | Initial velocity (m/s) | | 0 | −0.4 | −0.4 | −0.4 | −0.8 | −1.0 | −1.0 |
| Flight performance | Carry (m) | | 215.2 | 211.0 | 211.2 | 211.2 | 207.0 | 205.1 | 204.9 |
| | Total (m) | | 229.3 | 225.5 | 224.8 | 225.1 | 221.1 | 220.0 | 219.5 |

TABLE 3

| Components (pbw) | | | Example | | | Comparative Example | | |
|---|---|---|---|---|---|---|---|---|
| | | | 11 | 12 | 13 | 8 | 9 | 10 |
| Polybutadiene | BR01 | | | | | 100 | | |
| | BR11 | | | 10 | | | | |
| | CB22 | | | | | | | |
| | Shell 1220 | | | | | | | |
| | CB24 | | | | | | | |
| | CNB700 | | | | | | | |
| | HCBN-13 | | 100 | 90 | 100 | 100 | | 100 |
| | HCBN-2 | | | | | | | |
| Peroxide | | Half-life at 155° C. (sec) | | | | | | |
| | (a) Perhexa 3M-40 | 40 | 0.12 | 0.12 | 0.06 | 0.24 | 0.24 | |
| | Vulcup R | 0.5 | | | | | | |
| | (b) Percumyl D | 480 | 0.3 | 0.3 | 0.3 | 0.6 | 0.6 | 1.8 |
| | Varox 231 XL | 40 | | | | | | |
| Half-life ratio ($b_t/a_t$) | | | 12 | 12 | 12 | 12 | 12 | ∞ |
| Total amount of peroxides | | | 0.42 | 0.42 | 0.36 | 0.84 | 0.84 | 1.8 |
| Zinc oxide | | | 32.8 | 32.8 | 32.8 | 33.5 | 33.5 | 34 |
| Antioxidant | Nocrack NS-6 | | 0.1 | 0.1 | 0.1 | 0.1 | 0.1 | 0.1 |
| Processing aids | SR-350 | | | | | | | |
| Zinc acrylate | | | 26 | 26 | 26 | 24 | 24 | 24 |
| Organosulfur compound | Zn salt of pentachlorothiophenol | | 1 | 1 | 1 | 1 | 1 | 1 |
| Core | Vulcanization time (min) | | 14 | 15 | 15 | 13 | 15 | 15 |
| | Deflection (mm) under 100 kg load | | 4.0 | 4.1 | 4.2 | 4.0 | 4.0 | 3.9 |
| | Initial velocity (m/s) | | +0.3 | +0.2 | +0.2 | 0 | −0.4 | −0.5 |
| Flight performance | Carry (m) | | 219.9 | 218.9 | 219.1 | 217.1 | 213.0 | 212.2 |
| | Total (m) | | 234.0 | 233.2 | 233.4 | 231.1 | 227.2 | 226.0 |

Note:
Polybutadiene BR01: made by JSR Corporation, cis-1,4 content 96%, Mooney viscosity ($ML_{1+4}$ (100° C.)) 44, polydispersity index Mw/Mn 4.2, Ni catalyst, solution viscosity 150 mPa · s
Polybutadiene BR11: made by JSR Corporation, cis-1,4 content 96%, Mooney viscosity ($ML_{1+4}$ (100° C.)) 44, polydispersity index Mw/Mn 4.1, Ni catalyst, solution viscosity 270 mPa · s
Polybutadiene CB22: made by Bayer AG, cis-1,4 content 98%, Mooney viscosity ($ML_{1+4}$ (100° C.)) 62, polydispersity index Mw/Mn 7.1, Nd catalyst
Shell 1220: made by Shell, cis-1,4 content 96%, Mooney viscosity ($ML_{1+4}$ (100° C.)) 44, polydispersity index Mw/Mn 3.1, Nd catalyst
Polybutadiene CB24: made by Bayer AG, cis-1,4 content 94%, Mooney viscosity ($ML_{1+4}$ (100° C.)) 48, polydispersity index Mw/Mn 2.4, Nd catalyst
CNB700: made by JSR Corporation, cis-1,4 content 96%, Mooney viscosity ($ML_{1+4}$ (100° C.)) 43, polydispersity index Mw/Mn 2.8, Nd catalyst
HCBN-13: made by JSR Corporation, cis-1,4 content 96%, Mooney viscosity ($ML_{1+4}$ (100° C.)) 53, polydispersity index Mw/Mn 3.2, Nd catalyst
HCBN-2: made by JSR Corporation, cis-1,4 content 96%, Mooney viscosity ($ML_{1+4}$ (100° C.)) 40, polydispersity index Mw/Mn 3.3, Nd catalyst
Perhexa 3M-40: made by NOF Corporation Perhexa 3M-40 is a 40% dilution. The addition amount is shown by a net amount of 1,1-bis(t-butylperoxy)-3,3,5-trimethylcyclohexane.
Vulcup R: a-a bis(t-butylperoxy)diisopropylenebenzene, made by Hercules
Percumyl D; dicumyl peroxide, made by NOF Corporation
Varox 231XL: 1,1-bis(t-butylperoxy)-3,3,5-trimethylcyclohexane, made by Hercules
Nocrack NS-6: 2,21-methylenebis(4-methyl-6-t-butylphenol), made by Ouchi Shinko Chemical Industry Co., Ltd.
SR-350: trimethylolpropane trimethacrylate, made by Elastochem From the results of Tables 1 and 2, the following conclusion is ascertained.

Comparative Example 1

Because of a large amount of organic peroxides added, the resilience and flight distance are reduced.

Comparative Example 2

Because of polybutadiene synthesized with Ni catalyst and a low Mooney viscosity, the vulcanization time is delayed and the resilience and flight distance are reduced.

Comparative Example 3

Because of a large proportion of polybutadiene synthesized with Ni catalyst and because of a single organic peroxide used in a large amount, the resilience and flight distance are reduced.

Comparative Example 4

Because of a single organic peroxide used in a large amount, the resilience and flight distance are reduced.

Comparative Example 5

Because of a too high half-life ratio entailing less efficient crosslinking reaction, the resilience and flight distance are reduced.

Comparative Example 6

Because of a single organic peroxide used in a large amount, the resilience and flight distance are reduced.

Comparative Example 7

Because of a single organic peroxide used in a large amount, the resilience and flight distance are reduced.

In contrast, the balls of Examples exhibited improved resilience and flight performance despite a small amount of organic peroxides.

From the results of Table 3, the following conclusion is ascertained.

Comparative Example 8

Because of a large amount of organic peroxides added, the resilience and flight distance are reduced.

Comparative Example 9

Because of polybutadiene synthesized with Ni catalyst and a low Mooney viscosity and because of a large amount of organic peroxides added, the resilience and flight distance are reduced.

Comparative Example 10

Because of a single organic peroxide used in a large amount, the resilience and flight distance are reduced.

In contrast, the balls of Examples exhibited improved resilience and flight performance.

The invention claimed is:

1. A golf ball characterized by comprising a molded and vulcanized product of a rubber composition as a constituent component, the rubber composition comprising
   100 parts by weight of a base rubber including 60 to 100% by weight of a polybutadiene containing at least 60% by weight of cis-1,4-bond, having a Mooney viscosity ($MIL_{1+4}$ (100° C.)) of at least 52, and synthesized using a rare-earth catalyst,
   10 to 60 parts by weight of an unsaturated carboxylic acid and/or a metal salt thereof,
   0.1 to 5 parts by weight of an organosulfur compound selected from the group consisting of pentachlorothiophenol, pentafluorothiophenol, pentabromothiophenol, p-chlorothiophenol, and zinc salts thereof, diphenyl polysulfides, dibenzyl polysulfides, dibenzoyl polysulfides, dibenzothiazoyl polysulfides, dithiobenzoyl polysulfides, and alkylphenyl disulfides,
   5 to 80 parts by weight of an inorganic filler, and
   at least two organic peroxides including an organic peroxide having the shortest half-life at 155° C. designated (a) and another organic peroxide having the longest half-life at 155° C. designated (b), a ratio of half-lives ($b_t/a_t$) being from 7 to 16 wherein $a_t$ is the half-life of (a) of at least 15 seconds and up to 120 seconds and $b_t$ is the half-life of (b) of at least 300 seconds and up to 600 seconds, a total content of the organic peroxides being 0.1 to 0.8 part by weight per 100 parts by weight of said base rubber.

2. The golf ball of claim 1 wherein the polybutadiene has a polydispersity index Mw/Mn of 2.0 to 8.0 wherein Mw is a weight average molecular weight and Mn is a number average molecular weight.

3. The golf ball of claim 1 wherein the polybutadiene is a modified polybutadiene rubber which has been synthesized using a neodymium catalyst and subsequently reacted with an end group modifier.

4. The golf ball of claim 1 wherein said base rubber contains, in addition to said polybutadiene, a second polybutadiene synthesized using a Group VIII catalyst in an amount of up to 40% by weight, said second polybutadiene having a Mooney viscosity ($ML_{1+4}$ (100° C.)) of less than 50 and a viscosity of 200 mPa·s to 400 mPa·s at 25° C. in a 5 wt % toluene solution thereof.

5. The golf ball of claim 1 wherein the organic peroxide (a) is 1,1-bis(t-butylperoxy)-3,3,5-trimethylcyclohexane and the organic peroxide (b) is dicumyl peroxide.

* * * * *